United States Patent [19]

Busser

[11] Patent Number: 4,896,727

[45] Date of Patent: Jan. 30, 1990

[54] MEDIUM AND METHOD FOR FILLING THE HORN WALL OF A HORSE'S HOOF

[76] Inventor: Wilhelmus G. H. M. Busser, Julianalaan 42, 3871 VK Hoevelaken, Netherlands

[21] Appl. No.: 206,840

[22] Filed: Jun. 15, 1988

[30] Foreign Application Priority Data

Jun. 18, 1987 [NL] Netherlands .......................... 8701417

[51] Int. Cl.$^4$ .............................................. A01L 5/00
[52] U.S. Cl. ................................ 168/4; 168/DIG. 1; 606/212
[58] Field of Search .............. 168/4, DIG. 1; 128/336

[56] References Cited

U.S. PATENT DOCUMENTS

| | | | |
|---|---|---|---|
| 3,682,179 | 8/1972 | Firth et al. | 128/336 |
| 3,782,473 | 1/1974 | Spencer | 168/4 |
| 4,182,340 | 1/1980 | Spencer | 128/336 |
| 4,237,981 | 12/1980 | Stübbe | 168/4 |
| 4,765,411 | 8/1988 | Tennant | 168/4 |

FOREIGN PATENT DOCUMENTS

| | | | |
|---|---|---|---|
| 235072 | 4/1986 | German Democratic Rep. | 168/4 |
| 1239202 | 7/1971 | United Kingdom | 168/4 |

*Primary Examiner*—Robert P. Swiatek
*Attorney, Agent, or Firm*—Edmund M. Jaskiewicz

[57] ABSTRACT

A medium and a method for filling or replacing the horn wall or horny parts of the coffin of the hoof of an animal, particularly a horse, the medium consisting of a mixture of a plurality of components, of which one is a synthetic resin and another consists of filler particles such as wood, rubber, cork or a combination of filler particles, the mixture being adapted to be cured by the addition of a hardening catalyst and optionally an accelerator, and the method comprising first freeing the horse's hoof of the parts which are to be replaced, whereupon the shoe is placed under the hoof with the nails already in the correct desired positions, the whole area there being degreased, for example with acetone, thereupon all holes being liberally filled with a medium which hardens in the course of time, the outer surface then being finished after the filling medium has become touch-hard.

11 Claims, 1 Drawing Sheet

MEDIUM AND METHOD FOR FILLING THE HORN WALL OF A HORSE'S HOOF

The invention relates to a medium and a method for filling or replacing the horn wall or horny parts of the coffin of the hoof of an animal, particularly a horse.

Some animals have hooves. These hooves partly consist of horn. Thus, horses' legs are provided with a rather thick layer of horn which, as a shield, covers the entire front at the bottom. This horny layer grows continuously and continuously wears away near the bottom. Just like the nails of humans, this horny layer must always be supplied with nutrients. If an adequate supply of nutrients, such as liquids, fats and the like, is not provided, this will result in the crumbling of the horny layer. Pieces of the horny layer will then easily break off, so that the sensitive skin may be exposed to a greater or lesser extent. If the foot is struck, the nerves lying under the horny layer will be more sharply stimulated, with the consequence that the horse will attempt to spare its feet. This will be recognized when the horse starts to limp.

The crumbling away of the horny layer tends to occur still more easily in horses because a horse's hooves are regularly fitted with shoes; these shoes are fastened with the aid of nails driven into the horny layer. If this horny layer is in poor condition, various parts of this layer will very quickly become detached, the nails acting as wedges. The thinner the layer of horn, the more difficult it becomes to fasten a horseshoe under the animal's foot.

In addition to the fact that a horse will limp if parts of the horny layer crumble away, the circulation of blood to the foot will also be impaired. This is a consequence of the failure of the hoof mechanism to function properly because of the reduced loading of the hoof. Because of the elasticity of the frog cushions and the coffin bone, on the loading of the hoof the rear half of the hoof becomes widened, the sole becomes flatter, and the support parts and the frog are pressed down. When the hoof is loaded, the blood is driven out of it, and as soon as it is relieved of load the blood will flow back; there is thus a kind of lift and force pump action. Movement is therefore good for the growth of the hoof, particularly calm movement. This therefore implies that the hooves should always be resilient. If the horn dries out, it becomes hard and is no longer resilient.

The invention seeks to provide a medium making it possible to repair the horny layer of animals, and therefore in particular of horses, or at least to fill parts of the horny layer, whereby the underlying horny layer is protected, and in particular a medium which enables the horny layer to be thickened in such a manner that a horseshoe can be fastened to it.

This aim is achieved with a medium according to the invention which consists of a mixture of a plurality of components, of which one is a synthetic resin and another consists of filler particles, such as wood, rubber cork or a combination of filler particles, said mixture being adapted to be cured by the addition of a hardening catalyst and optionally an accelerator. A medium of this kind has the advantage that it can be applied in the liquid state and that after it has been cured it will be possible to use the horse again directly. It should be pointed out that as much hardening catalyst or hardener is used as will ensure that the mixture will be touch-hard within a few minutes, since otherwise the animal would have to stand too long without a load on one leg. However, it must be ensured that the heat of reaction released is not so great that the animal's foot will be excessively heated and the nerves thus affected. It has been found in practice that the medium has a very good action, that the horse can be used again after one day, that nails for the horseshoe adhere very well in the medium, and that the hoof mechanism, which is so important for good circulation of blood to the horse's foot, is fully operative. It has also been found that the medium does not become detached from the hoof, which is usually the result of the flow of nutrients to the horny layer and the fact that they cannot be carried away.

The filler particles used should preferably be as small as possible, and in any case smaller than 1 millimeter. The smaller the particles, the better the action.

Although it has been found that very good results are obtained if the synthetic resin used is a bisphenol A epoxy resin with a reactive diluent, the hardener or hardening catalyst used being a polymercaptan epoxy adduct, good results can nevertheless also be obtained if the synthetic resin used is another epoxy resin, a thermosetting resin which preferably sets below 50°, a resin which hardens under the action of ultraviolet light, or a polyester.

The method for the treatment of horses' hooves preferably consists in first freeing the hoof of a horse of the parts which are to be replaced, thereupon removing parts of the remaining sound layer of horn, so that the outer surface of the holes to be filled is more or less jagged or at least not smooth and even but rough, and then fastening the horseshoe under the hoof with the aid of nails or, if that is not possible, with the aid of expedient means, such as for example lips which are formed on the shoe and which are fastened in the sound horny layer with the aid of lips and self-tapping screws, while at the same time the hoof nails are already placed in the correct position, whereupon the parts where the medium is to be applied should be degreased and all the holes liberally filled with a medium according to the invention and the medium allowed to harden, the outer surface first preferably being wrapped around with adhesive tape or the like. After the material has hardened to a touch-hard mass, the outer surface can be finished off. The invention will be explained in greater detail with the aid of the drawings, in which:

Figure 1:
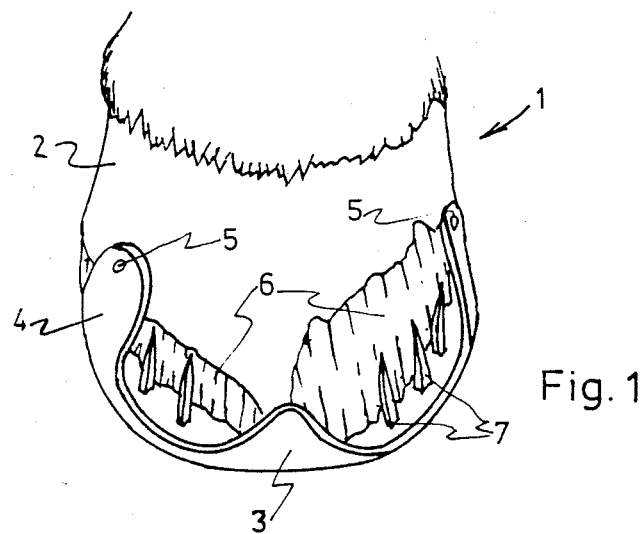
FIG. 1 shows a horse's hoof after the horny layer has been partly removed and the shoe has been placed in position.

A horse's hoof 1 from which the horny layer has been partly removed is shown in FIG. 1. A shoe 3 has been fastened under the hoof with the aid of two lips 4 and self-tapping screws 5. The wall surface 6 has sharp angles and is somewhat rough in order to provide a better key. Nails 7, which fit into the horseshoe from below and are normally driven into the horny layer, are here already in place and are situated in that portion from which the horny layer 2 has been removed.

Figure 2:
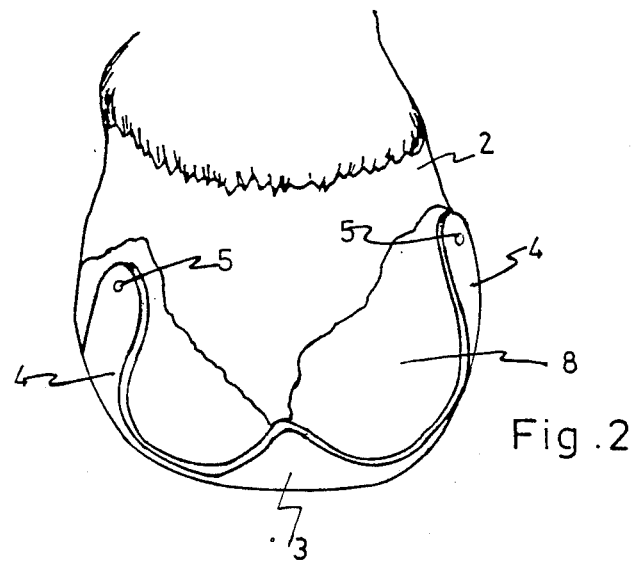
FIG. 2 shows the same hoof after the holes have been filled with a medium according to the invention.

FIG. 2 shows the same horse's hoof after it has been filled with a medium 8 according to the invention. The nails are now entirely covered by the medium 8. It is clear that the mechanism of the hoof remains completely intact, that the fillings will not become detached, and in the course of time will of their own accord participate in growth and wear away. The sound horn will thus be enabled to take the place of the parts removed, so that after a few months nothing will be visible and it will be possible to fit a new shoe under the hoof and also to drive nails into the new, sound horny layer.

What is claimed is:

1. Medium for filling or replacing portions of the horn wall or horny parts of the hoof of an animal, particularly a horse, wherein the medium consists of a mixture of a plurality of components, of which one is a synthetic resin and another consists of filler particles which remain resilient and comprise wood, rubber, cork or a combination of filler particles, said mixture being adapted to be cured by the addition of a hardening catalyst and optionally an accelerator.

2. Medium according to claim 1, wherein the particles are smaller than 1 mm and are thoroughly mixed with the synthetic resin before the hardening catalyst is added.

3. Medium according to claim 1, wherein the synthetic resin is an epoxy resin with a reactive diluent.

4. Medium according to claim 1, wherein the synthetic resin is a thermosetting resin which sets below a temperature of 50° C.

5. Medium according to claim 1, wherein the synthetic resin which hardens through the action of ultraviolet light.

6. Medium according to claim 1, wherein the synthetic resin is a bisphenol A epoxy resin with a reactive diluent.

7. Medium according to claim 1, wherein the synthetic resin is a polyester.

8. Method of filling or replacing parts of the horn wall or hoof of an animal, particularly a horse, wherein the horse's hoof is first freed of the parts which are to be replaced, that a shoe and nails therein is placed under the hoof with the nails already in the correct desired positions, that then the whole area is degreased, that thereupon all holes are liberally filled with a medium which hardens in the course of time, the medium consisting of a synthetic resin having therein filler particles which remain resilient, and that the outer surface is then finished after the filling medium has become touch-hard.

9. Method according to claim 8, wherein after the parts which are to be replaced have been removed some pieces of the remaining sound parts are also removed, so that the outer side or surface of the holes which are to be filled is more or less jagged or at least is not smooth.

10. Method according to claim 8, wherein after the medium has been placed in the holes and cracks to be filled the whole area is lightly wrapped with adhesive tape or the like, such as adhesive linen or wide tape.

11. Method according to claim 8, wherein the horseshoe is held in place with the aid of auxiliary means before the filling medium is applied, which auxiliary means may consist of lips fastened by means of, for example, self-tapping screws on a sound part of the hoof.

* * * * *